United States Patent
Woo et al.

(10) Patent No.: US 10,332,231 B2
(45) Date of Patent: Jun. 25, 2019

(54) COMPUTING SYSTEM AND METHOD OF PERFORMING TILE-BASED RENDERING OF GRAPHICS PIPELINE

(71) Applicant: SAMSUNG ELECTRONICS CO., LTD., Suwon-si (KR)

(72) Inventors: Sangoak Woo, Anyang-si (KR); Jongpil Son, Seongnam-si (KR); Seungcheol Baek, Seoul (KR); Soojung Ryu, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 47 days.

(21) Appl. No.: 15/407,980

(22) Filed: Jan. 17, 2017

(65) Prior Publication Data

US 2017/0213312 A1 Jul. 27, 2017

(30) Foreign Application Priority Data

Jan. 25, 2016 (KR) ........................ 10-2016-0008906

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
CPC ..... G06T 1/20; G06T 15/005; G06T 2200/04; G06T 2207/20021; G06F 2209/509; G09G 5/363; H04N 19/436; H04N 19/85
See application file for complete search history.

(56) References Cited

U.S. PATENT DOCUMENTS

| | | | |
|---|---|---|---|
| 8,547,385 B2 * | 10/2013 | Jiao | G06T 1/60 345/541 |
| 2011/0063296 A1 | 3/2011 | Bolz et al. | |
| 2014/0333620 A1 * | 11/2014 | Park | G06T 15/005 345/422 |
| 2015/0091913 A1 | 4/2015 | Sathe et al. | |
| 2015/0178974 A1 | 6/2015 | Goel et al. | |
| 2016/0098200 A1 * | 4/2016 | Guz | G06F 11/30 711/154 |

OTHER PUBLICATIONS

Ahn et al. ("PIM-Enabled Instructions: A Low-Overhead, Locality-Aware Processing-in-Memory Architecture", Jun. 2015, retrieved from IEEE Xplore. (Year: 2015).*

* cited by examiner

*Primary Examiner* — Hau H Nguyen
(74) *Attorney, Agent, or Firm* — Harness, Dickey & Pierce, P.L.C.

(57) ABSTRACT

A computing system includes a memory device comprising a memory array and an internal processor configured to perform a first sub pipeline of a graphics pipeline for tile-based rendering by using graphics data stored in the memory array, for offload processing of the first sub pipeline from a host processor; and the host processor configured to perform a second sub pipeline of the graphics pipeline by using a result of the first sub pipeline stored in the memory array.

17 Claims, 11 Drawing Sheets

COMPUTING SYSTEM AND METHOD OF PERFORMING TILE-BASED RENDERING OF GRAPHICS PIPELINE

CROSS-REFERENCE TO RELATED APPLICATION

This application claims the benefit under 35 USC § 119(a) of Korean Patent Application No. 10-2016-0008906, filed on Jan. 25, 2016, in the Korean Intellectual Property Office, the entire disclosure of which is incorporated herein by reference for all purposes.

BACKGROUND

1. Field

The following description relates to computing systems and methods of performing a graphics pipeline for tile-based rendering of the computing systems.

2. Description of Related Art

Processors are becoming more and more important in computing environments. Image and video resolution are increasing, and software algorithms for processing images and video having increased resolution are becoming increasingly complicated. Development of a dual-core processor, a quad-core processor, and a variety of processor architecture techniques such as multi-threading has resulted in the development of peripheral technical fields, for example, in image processing and software engineering. A processor operates with limited resources in a computing environment. For example, a communication bandwidth between a processor and a memory may be limited due to bottlenecks, and thus, energy consumption of the processor may also be restricted to a fixed level or lower. Therefore, ways to improving processing performance with limited resources in a computing environment are being studied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a computing system includes a memory device comprising a memory array and an internal processor configured to perform a first sub pipeline of a graphics pipeline for tile-based rendering by using graphics data stored in the memory array, for offload processing of the first sub pipeline from a host processor, and the host processor configured to perform a second sub pipeline of the graphics pipeline by using a result of the first sub pipeline stored in the memory array.

The first sub pipeline may include a binning pipeline configured to generate information about a primitive list corresponding to tiles for graphics data stored in the memory array or another memory of the memory device.

The memory array may be configured to store information about a primitive list corresponding to tiles, as a result of the first sub pipeline. The second sub pipeline may include a rendering pipeline configured to perform rendering per tile by reading the stored information about the primitive list from the memory array.

The host processor may be a graphics processing unit (GPU), and the internal processor may be a processor-in-memory (PIM).

The first sub pipeline may be an input assembler stage configured to supply data of vertices based on input draw calls. The second sub pipeline may include a rendering pipeline and stages of a binning pipeline excluding the input assembler stage. The computing system may be configured to determine whether to perform the offload processing of the first sub pipeline based on efficiency of a vertex cache.

If determined to not perform the offload processing, the host processor is controlled to perform the first sub pipeline In another general aspect, a method of performing a graphics pipeline for tile-based rendering of a computing system includes offload processing of a first sub pipeline of the graphics pipeline to an internal processor in a memory device that includes a memory array by using graphics data stored in the memory array, storing in the memory array a result of the first sub pipeline processed by the internal processor, and performing by a host processor a second sub pipeline using the result of the first sub pipeline stored in the memory array.

The first sub pipeline may include a binning pipeline configured to generate information about a primitive list corresponding to tiles.

The result of the first sub pipeline may include information about a primitive list corresponding to tiles. The second sub pipeline may include a rendering pipeline configured to perform rendering per tile by reading the stored information about the primitive list from the memory array.

The first sub pipeline may be an input assembler stage configured to supply data of vertices based on input draw calls. The second sub pipeline may include a rendering pipeline and stages of a binning pipeline excluding the input assembler stage. The offload processing includes selectively offload processing based on a determination of whether to perform the offload processing, the determination being based on efficiency of a vertex cache.

In another general aspect, host processor includes an offload determiner configured to select between whether an internal processor in an exterior memory device performing an offload processing of a first sub pipeline included in a graphics pipeline for tile-based rendering and the host processor performing the first sub pipeline, and a graphics pipeline core configured to receive a result of the first sub pipeline and to perform a second sub pipeline to be processed following the first sub pipeline.

The first sub pipeline may include a binning pipeline configured to generate information about a primitive list corresponding to tiles. The second sub pipeline may include a rendering pipeline configured to perform rendering per tile by reading the information about the primitive list from a memory array in the memory device.

The first sub pipeline may be an input assembler stage configured to supply data of vertices based on input draw calls. The second sub pipeline may include a rendering pipeline and stages of a binning pipeline excluding the input assembler stage.

The offload determiner may be configured to determine which of the exterior memory device and the graphics pipeline core to perform the first sub pipeline based on a determined efficiency of a vertex cache.

The offload determiner may be configured to transmit a command to an internal processor of the memory device to control the memory device to perform the offload processing upon determination that the internal processor is configured to perform offload processing.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the specification, it will be understood that when a unit is referred to as being "connected" to another element, it may be "directly connected" to the other element or "electrically connected" to the other element in a state in which intervening elements are present. In addition, it will be understood that when such a unit is referred to as "further comprising" another element, it may not exclude the other element but may further include the other element unless specifically oppositely indicates. In addition, terms such as " . . . unit", " . . . module", or the like refer to units that perform at least one function or operation, and the units are implemented as hardware, such as one or more processors or circuits, or as a combination of hardware and software.

Figure 1:
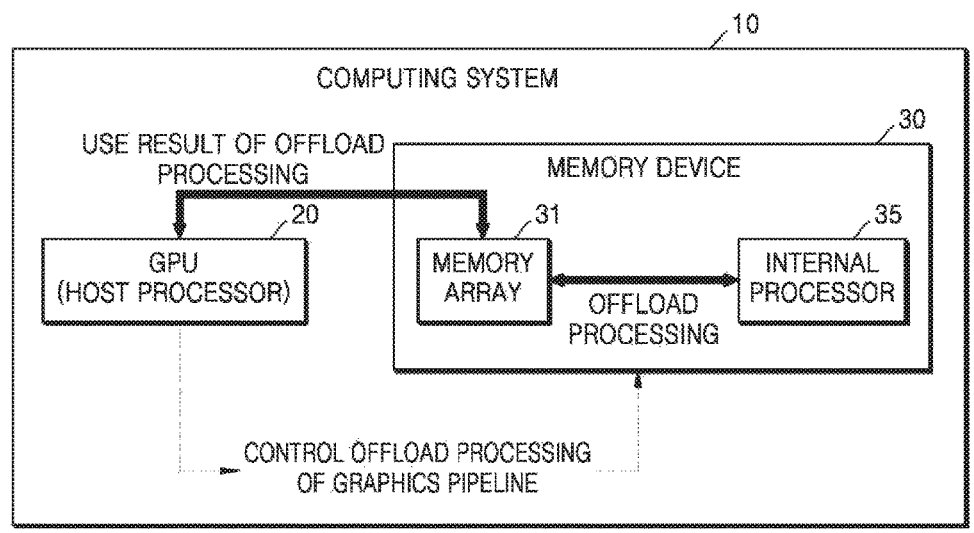
FIG. 1 is a block diagram illustrating a computing system according to an embodiment.

FIG. 1 is a block diagram illustrating a computing system according to an embodiment. Referring to FIG. 1, the computing system 10 includes a graphics processing unit (GPU) 20 and a memory device 30. Although select elements of the computing system 10 are described with respect to the computing system embodiment illustrated in FIG. 1, it will be understood by those of ordinary skill in the art that the computing system 10 may further include other general elements, for example, a central processing unit (CPU), or interfacing modules.

Examples of the computing system 10 include, but are not limited to, a desktop computer, a notebook computer, a smartphone, personal digital assistant (PDA), a mobile media player, a video game console, a television set-top box, a tablet device, an e-book reader, and a wearable device. That is, the computing system 10 may be representative of, as well as alternatively included in, various devices.

The GPU 20 is hardware controlling graphics processing of the computing system 10. The GPU 20 may be a dedicated graphics processor that performs various versions or types of graphics pipelines such as open graphic(s) library (OpenGL), DirectX, and Compute Unified Device Architecture (CUDA). The GPU 20 may be a hardware element that performs a three-dimensional (3D) graphics pipeline so as to render 3D objects included in a 3D image to transform the 3D image into a two-dimensional (2D) image to be displayed.

The GPU 20 may be controlled by a graphics application programming interface (API), which is executed in a CPU running an operating system (OS), and a driver of the GPU 20. The GPU 20 may control offload processing with respect to a graphics pipeline corresponding to the executed graphics API and the driver. The GPU 20 controls an internal processor 35 of the memory device 30 to perform the offload processing of the graphics pipeline. The term "offload" is used in the following description to indicate that the internal processor 35 performs a specific operation instead of the GPU 20 performing the specific operation, e.g., if the GPU 20 selects to alternatively offload a specific operation to the memory device 30 rather than the GPU 20 perform the specific operation, the GPU is also configured or configurable to perform the specific operation according to one or more embodiments. FIG. 1 illustrates the GPU 20 controlling the offload processing, but the embodiments are not limited thereto and a CPU may also control the offload processing.

In one or more embodiments, among other rendering and graphics pipeline rending approaches, the GPU 20 performs a graphics pipeline for tile-based rendering (TBR). The term "tile-based rendering" used herein corresponds to a rendering process performed on a per-tile basis after each frame of a video is divided or partitioned into a plurality of tiles. Since a tile-based architecture may have a low throughput compared to when a frame is processed per pixel, a mobile device (or an embedded device) that has a low processing performance, such as a smart phone or a tablet device, may use the tile-based architecture for graphics rendering. Such a mobile device may selectively perform such tile-based or pixel-based rendering.

The memory device 30 includes a memory array 31 and an internal processor 35. The internal processor 35 is hardware having a processing function similar to one or more operations of the GPU 20 and is packaged in a chip of a memory package of the memory device 30 together with the memory array 31. Thus, the internal processor 35 and the memory array 31 are integrated on a memory package. The term [*WGG1*] "internal" indicates that the internal processor 35 is contained in the memory device 30. Therefore, herein, a processor "outside" the memory device 30 in the computing system 10 may be, for example, the GPU 20 or a CPU.

The internal processor 35 may be a processor-in-memory (PIM). A PIM is a device for processing data of the memory array 31 without latency that results from connecting to an outside a processor, which is implemented by hardware logic, with the memory array 31 via a dedicated pin. In a PIM architecture, a processor can rapidly access a memory with low latency since the processor and the memory are integrated and implemented as on-chip memory. The memory device 30 including the internal processor 35 such as a PIM may also be referred to by different terms such as intelligent random access memory (RAM), computational RAM, or smart memory.

As described above, the internal processor 35 performs the offload processing of the graphics pipeline, which is normally performed by the GPU 20, such as normally when an internal processor 35 is not used or the GPU 20 selects to not perform the select processing of the graphics pipeline, but rather to offload the same to one or more of the memory device 30 in the computing system. For example, the internal processor 35 may process the graphics pipeline instead of the GPU 20, where the GPU 20 will be referred to herein as a host processor. Thus, hereinafter, a host processor will be described as the GPU 20 in the present embodiments, but a CPU may also be a host processor depending on a role of the internal processor 35.

The memory array 31 included in the memory device 30 may be a RAM such as dynamic RAM (DRAM) or static RAM (SRAM), or may be a device such as read-only memory (ROM) or an electrically erasable programmable ROM (EEPROM). For example, the memory array 31 stores data (for example, primitive information, vertex information, a tile list, a display list, frame information, etc.) processed by the GPU 20 or the internal processor 35 and provides data (for example, graphics data, a tile schedule, etc.) to be processed by the GPU 20 or the internal processor 35 to the GPU 20 or the internal processor 35.

The internal processor 35, in order to perform a graphics pipeline in the memory device 30, reads graphics data (for example, data of a 3D object) from the memory array 31. Afterwards, the internal processor 35 stores a result of offload processing with respect to some stages of the graphics pipeline in the memory array 31. When remaining stages of the graphics pipeline is performed, the GPU 20 uses the result of the offload processing stored in the memory array 31.

It may take several hundred cycles for the GPU 20 to request, access, cache, and process data stored in the memory array 31, which may result in an increase in power consumption. Therefore, if the internal processor 35 in the memory device 30 performs specific operations of a graphics pipeline instead of the GPU 20 and the GPU 20 performs remaining operations of the graphics pipeline by using a result of the performing of the internal processor 35, use of memory bandwidth may be optimized and power consumption may be minimized.

Figure 2:
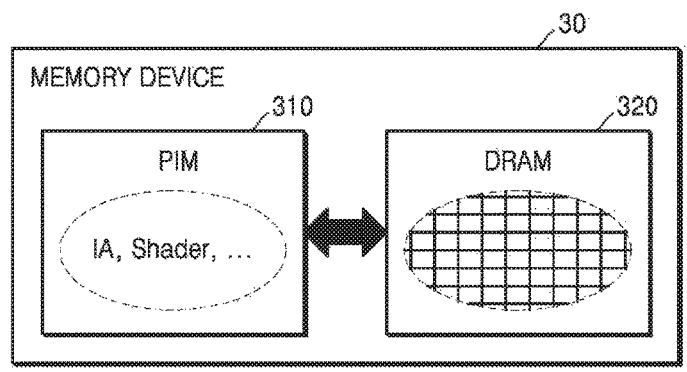
FIG. 2 is a view illustrating a detailed hardware configuration of a memory device according to an embodiment.

FIG. 2 is a view illustrating a detailed hardware configuration of a memory device 30 according to an embodiment. Referring to FIG. 2, the memory device 30 includes a PIM 310 and a DRAM 320. The PIM 310 is an example of the internal processor 35 of FIG. 1 and the DRAM 320 is an example of the memory array 31 of FIG. 1, though different respective architectures are also available. Though, the PIM 310 and the internal processor 35 may be discussed as being the same and the DRAM 320 and the memory array 31 may be discussed as being the same in one or more embodiments discussed below, embodiments are not limited to the same. FIG. 2 shows the memory array 31 to be DRAM 320 as an example only, and the embodiments are not limited thereto. The memory array 31 may comprise a different kind of memory like SRAM as well as the DRAM 320. Other general-purpose elements may be further included in addition to the elements shown in FIG. 2, as desired.

According to an embodiment, the PIM 310 is a processor configured to perform a graphics pipeline or pipeline operation for TBR, but is not limited thereto. For example, the PIM 310 may perform an assembling operation or a shading operation, in a graphics pipeline.

When offload processing is requested from the GPU 20 with respect to performing a graphics pipeline, the PIM 310 directly accesses the DRAM 320 in the memory device 30 and processes various operations for performing the graphics pipeline. As a result, a bandwidth of memory access of the GPU 20 and power consumption of the GPU 20 may be reduced, as the GPU 20 would typically repeatedly request such information from the memory device 30 for processing the pipeline by the GPU 20.

A result of the operation of the memory device 30 performing of the graphics pipeline with the internal processor 35, e.g., the PIM 310, is stored in the memory array 31, e.g., the DRAM 320. Afterwards, the performance result of the graphics pipeline stored in the DRAM 320 is used by the GPU 20, such as though a typical data request of the memory device 30.

Figure 3:
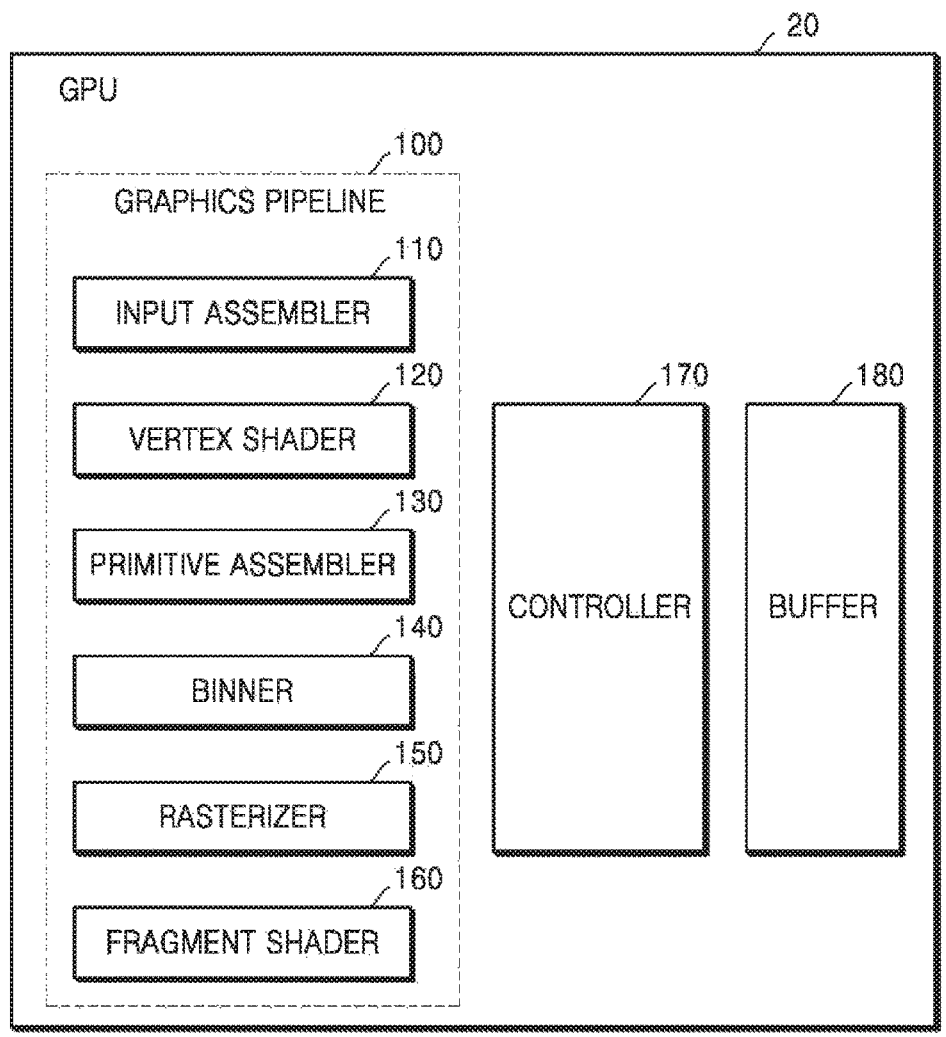
FIG. 3 is a block diagram illustrating a hardware configuration of a graphics processing unit (GPU), according to an embodiment.

FIG. 3 is a block diagram illustrating a hardware configuration of a GPU 20, according to an embodiment.

Referring to FIG. 3, the GPU 20 may include an input assembler 110, a vertex shader 120, a primitive assembler 130, a binner 140, a rasterizer 150, and a fragment shader 160, which perform the graphics pipeline 100, for example only. Furthermore, the GPU 20 may further include a controller 170 and a buffer 180, for example only. The above elements that perform the graphics pipeline 100 within the GPU 20 may be classified based on their functions as described below, though they may respectively be performed by the same or varying embodiments of processing elements of one or more processors. The above elements that perform the graphics pipeline 100 may also be implemented by execution of program logics or software modules of the GPU 20, for example, which respectively cause the functions to be performed by one or more processors as described below. Alternatively, the above elements that perform the graphics pipeline 100 may be implemented by sub processing units (or processor cores) included in the GPU 20. That is, implementation types of the above elements that perform the graphics pipeline 100 may not be particularly limited to any one.

As an example, the names of the above elements that perform the graphics pipeline 100 may be given based on the functions as described below, but it will be understood by those of ordinary skill in the art that the names may be variously changed and are not intended to be limiting to the same. The elements that perform the graphics pipeline 100 within the GPU 20 are used for convenience of description, but the names of the elements may vary according to the type of a graphics API. That is, the elements that perform the graphics pipeline 100 within the GPU 20 may variously correspond to names of elements defined in various types of APIs, such as DirectX, CUDA, or OpenGL.

The input assembler 110 supplies data of the vertices associated with objects stored in the memory array (e.g., 31 in FIG. 1) to the graphics pipeline 100, based on input draw calls. The vertices supplied by the graphics pipeline 100 may be related to a mesh or a patch that is an expression of a surface, but are not limited thereto. The draw call is a command indicating a frame on which an object is to be rendered and the object to be rendered on the frame. For example, the draw call may be a command for drawing primitives, such as triangles or rectangles, on an image or a frame.

The vertex shader 120, by using information about positions and attributes of vertices included in a frame, may determine a coordinate on a 3D space corresponding to each vertex.

The primitive assembler 130 converts the vertices into primitives.

The binner 140 performs binning or tiling by using the primitives output from the primitive assembler 130. For example, the binner 140 generates (bins) a tile list indicating information about tiles to which output primitives respectively belong by performing a depth test (or tile Z test). In other words, the binner 140 generates information about a primitive list corresponding to each of the tiles.

The rasterizer 150 may convert the output primitives into pixel values of a 2D space based on the generated tile list.

A fragment may mean pixels covered by the primitives. The fragment shader 160 may generate the primitives and determine a depth value, a stencil value, a color value, and the like of the fragment. A shading result of the fragment shader 160 may be stored in the buffer 180 (e.g., a frame buffer) and may be displayed as a frame of a video.

The controller 170 may control overall operations and functions of the elements 110 to 160 of the graphics pipeline 100 and the buffer 180.

Figure 4:
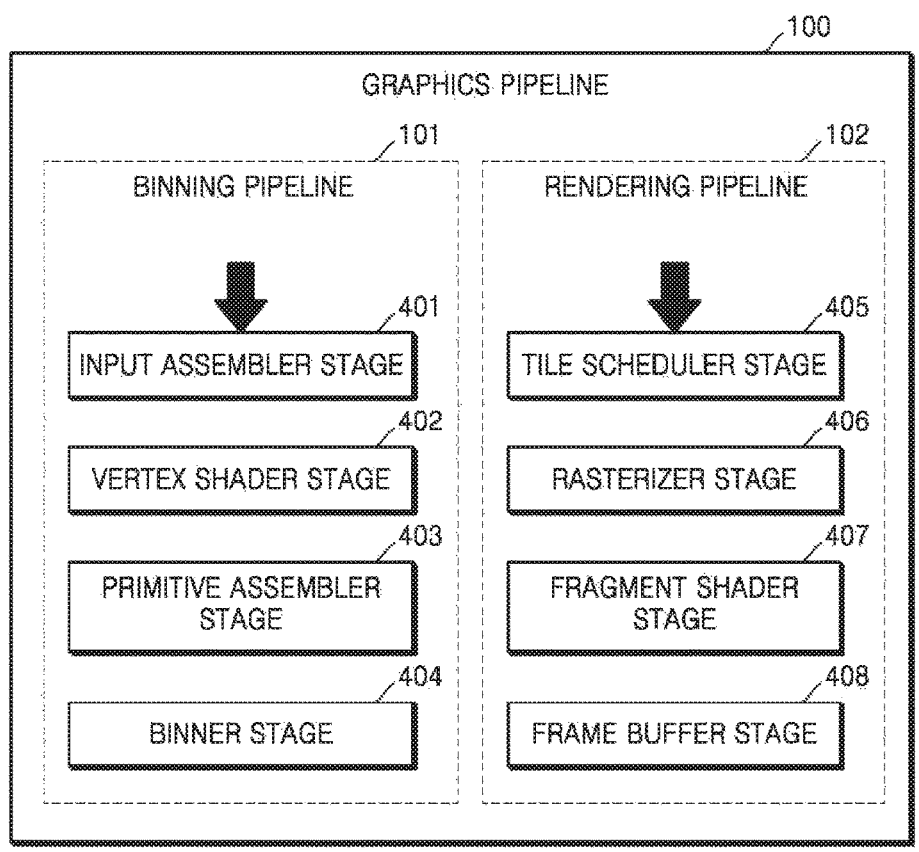
FIG. 4 is a view illustrating a graphics pipeline for tile-based rendering (TBR) according to an embodiment.

FIG. 4 is a view illustrating a graphics pipeline 100 for TBR according to an embodiment. Referring to FIG. 4, the graphics pipeline 100 operation for TBR includes a binning pipeline 101 operation generating information about a primitive list corresponding to tiles and a rendering pipeline 102 operation performing rendering per tile by reading the generated information about the primitive list.

The binning pipeline 101 operation may include an input assembler stage 401 performed by the input assembler 110, a vertex shader stage 402 performed by the vertex shader 120, a primitive assembler stage 403 performed by the primitive assembler 130, and a binner stage 404 performed by the binner 140.

The rendering pipeline 102 operation may include a tile scheduler stage 405 performed by the controller 170, a rasterizer stage 406 performed by the rasterizer 150, a fragment shader stage 407 performed by the fragment shader 160, and a frame buffer stage 408 performed by the buffer 180.

The stages included in the binning pipeline 101 and the rendering pipeline 102 are illustrated only for convenience of explanation, and therefore, the binning pipeline 101 and the rendering pipeline 102 may further include different stages (for example, a tessellation pipeline, etc.). Furthermore, names of each stage included in the binning pipeline 101 and the rendering pipeline 102 may vary according to the type of a graphics API.

Figure 5:
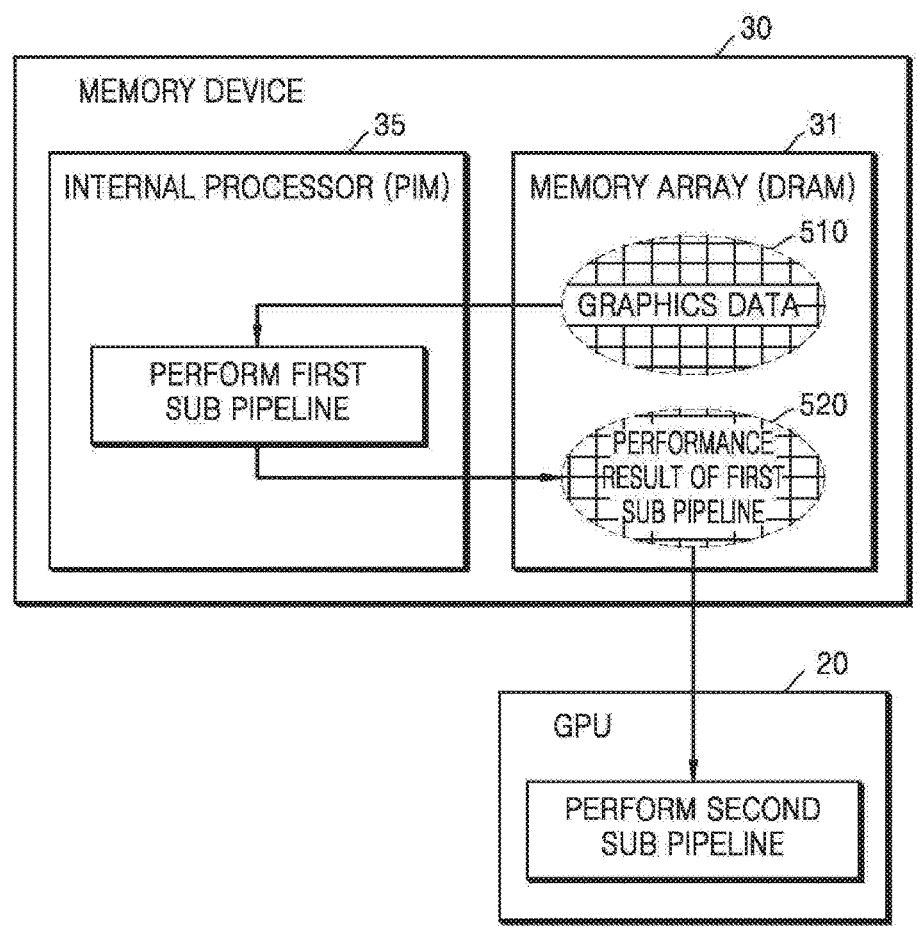
FIG. 5 is a view illustrating offload processing of a graphics pipeline for TBR between a GPU and an internal processor of a memory device.

FIG. 5 is a view illustrating offload processing of a graphics pipeline for TBR between a GPU 20 and an internal processor 35. Referring to FIG. 5, the internal processor 35 in a memory device 30, in an example offload processing of a first sub pipeline included in the graphics pipeline for TBR, performs the first sub pipeline by using graphics data (for example, data of a 3D object) 510 stored in a memory array 31. The internal processor 35 stores a performance result 520 of the example first sub pipeline in the memory array 31. The GPU 20, i.e., the example host processor, performs an example second sub pipeline processed following the example first sub pipeline performed by the internal processor 35. The GPU 20 uses the performance result 520 of the first sub pipeline stored in the memory array 31.

Each of the first and second example sub pipelines represent a sub pipeline including some of the pipeline stages of a graphics pipeline for TBR. For example, the first sub pipeline may be the binning pipeline 101 (of FIG. 4) included in a graphics pipeline for TBR, and the second sub pipeline may be the rendering pipeline 102 (of FIG. 4) included in a graphics pipeline for TBR. Alternatively, the first sub pipeline may include only the input assembler stage 401 (of FIG. 4), and the second sub pipeline may include the remaining stages 402 to 404 (of FIG. 4) of the binning pipeline 101 and the rendering pipeline 102 (of FIG. 4) without input assembler stage or stage operation for example. Thus, the types of stages of a graphics pipeline for TBR to be included in the first sub pipeline or the second sub pipeline may vary. Additionally, the GPU 20 may be configured to selectively perform the offload stage processing or the GPU 20 may be configured without the corresponding stage of the pipeline.

Figure 6:
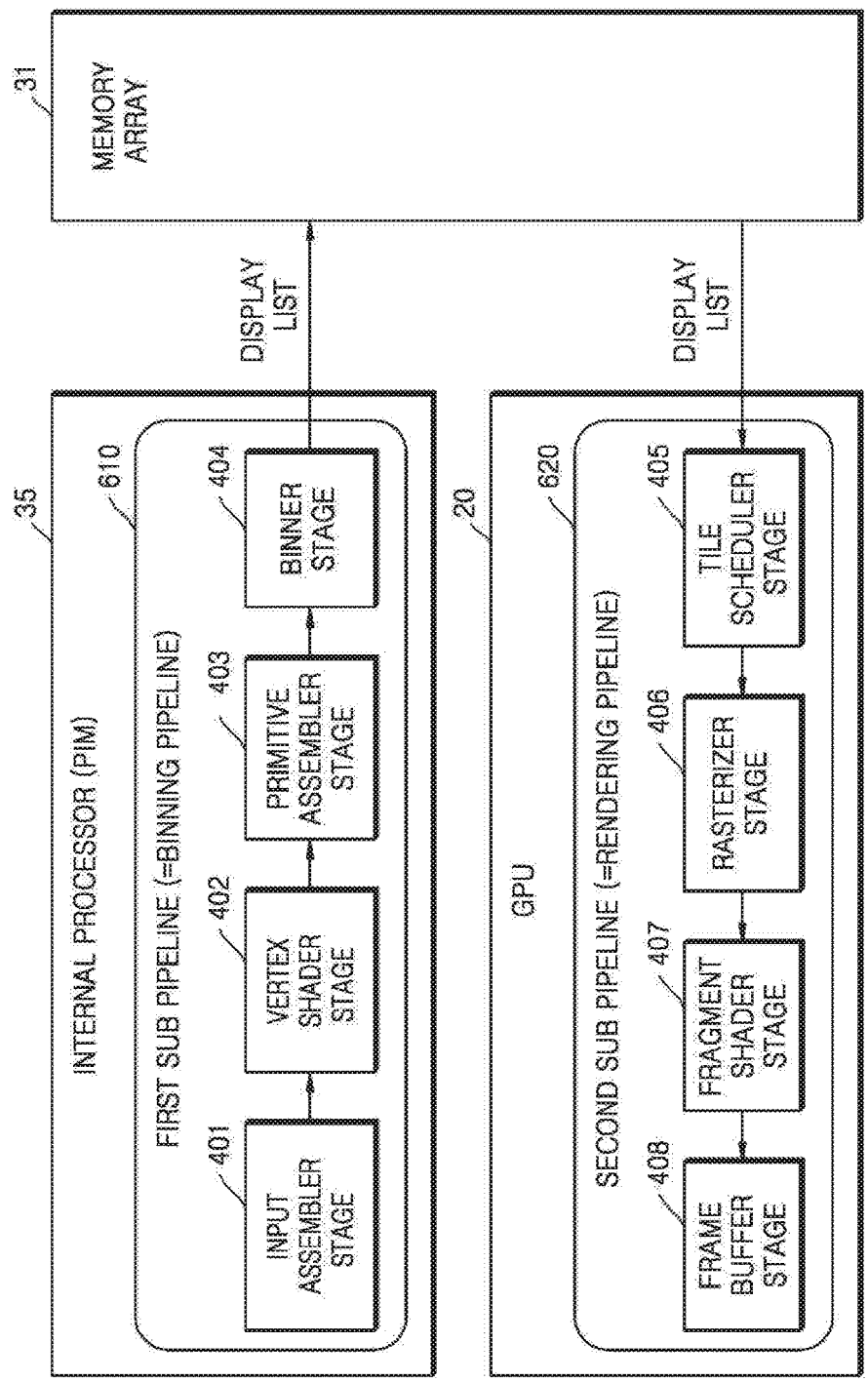
FIG. 6 is a view illustrating a GPU and an internal processor of a memory device performing a graphics pipeline for TBR through offload processing, according to an embodiment.

FIG. 6, as only an example, is a view illustrating a GPU 20 and an internal processor 35 performing a graphics pipeline for TBR through offload processing, according to an embodiment. Referring to FIG. 6, a first sub pipeline 610 corresponds to the binning pipeline 101 (of FIG. 4) included in a graphics pipeline for TBR, and a second sub pipeline 620 corresponds to the rendering pipeline 102 (of FIG. 4) included in a graphics pipeline for TBR, as an example only.

The internal processor 35 may be a PIM. When the graphics pipeline for TBR starts, the internal processor 35 reads graphics data from a memory array 31 and performs the first sub pipeline 610 (binning pipeline) including an input assembler stage 401, a vertex shader stage 402, a primitive assembler stage 403, and a binner stage 404, for example only. When the performing of the binner stage 404 is completed, the memory array 31 stores display list information, which is information about a primitive list corresponding to tiles, as a performance result of the first sub pipeline 610 (binning pipeline) by the internal processor 35.

When the storage of the display list information is completed, that is, when the performing of the first sub pipeline 610 (binning pipeline) by the internal processor 35 is completed, the GPU 20 reads the display list from the memory array 31 and performs the second sub pipeline 620 (rendering pipeline) including a tile scheduler stage 405, a rasterizer stage 406, a fragment shader stage 407, and a frame buffer stage 408. The tile scheduler stage 405 schedules an order of tiles to be processed for a rendering pipeline which is performed per tile. When the frame buffer stage 408 is completed, an image of a frame, in which a rendering process is completed, is stored in the buffer 180 (of FIG. 3) (for example, a frame buffer).

As illustrated in FIG. 6, the internal processor 35 may perform offload processing for some stages of a graphics pipeline for TBR instead of the GPU 20, and thus, a bandwidth of memory access of the GPU 20 and power consumption of the GPU 20 may be reduced compared to if/when the GPU 20 were to perform all pipeline stage operations.

Figure 7:
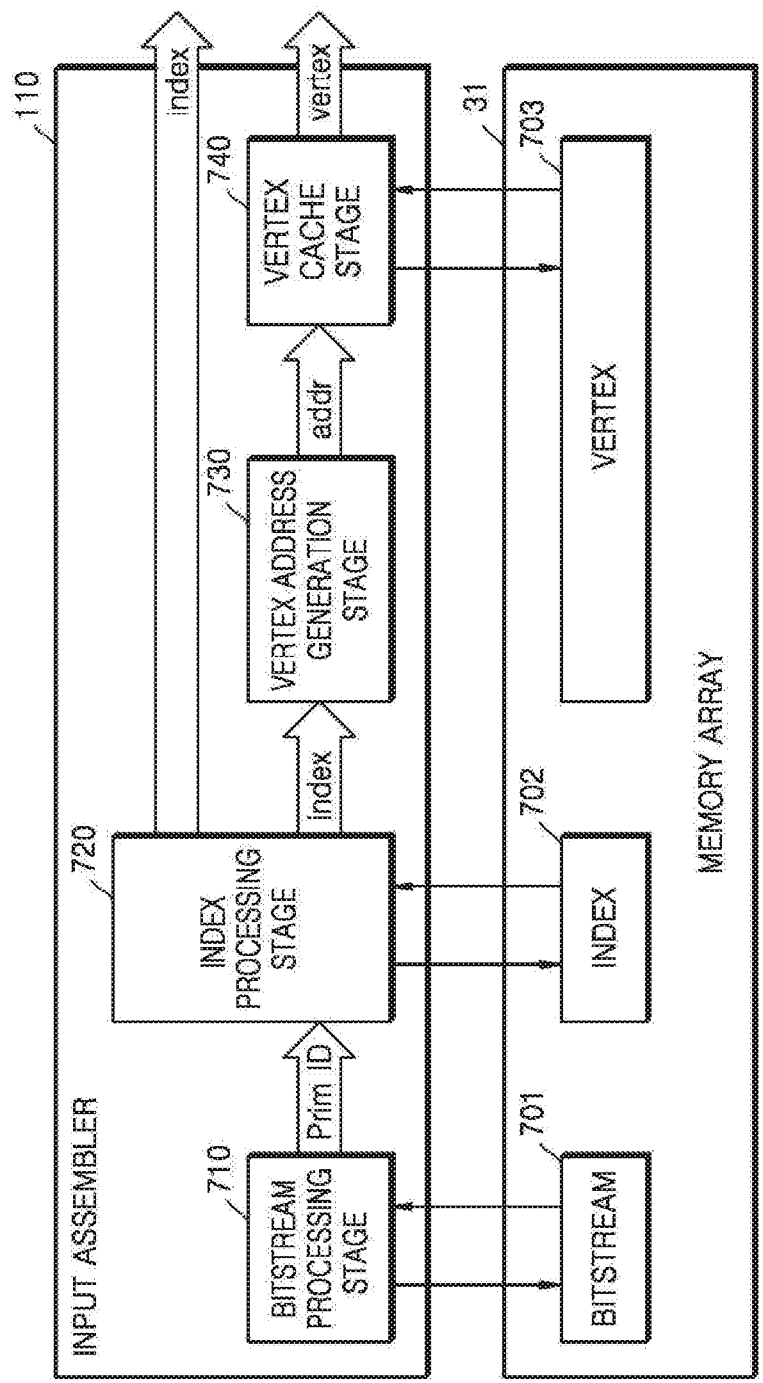
FIG. 7 is a view illustrating stages of an input assembler according to an embodiment.

FIG. 7, as an example only, is a view illustrating stages of an input assembler according to an embodiment. Referring to FIG. 7, an input assembler 110 may sequentially read a bitstream 701, an index 702, and a vertex 703 stored in the memory array 31 and stores data of vertices in a vertex cache stage 740. According to an example, the input assembler 110 may generate a primitive identifier (ID) through a bitstream processing stage 710 corresponding to the bitstream 701 read from the memory array 31. The input assembler 110 performs an index processing stage 720 matching the generated primitive ID with the index 702 read from the memory array 31, for example. The input assembler 110 may generate a vertex address by using the matched index in a vertex address generation stage 730, may read the vertex 703 corresponding to the generated vertex address from the memory array 31, and may store the vertex 703 in the vertex cache stage 740. As such, the input assembler 110 accesses the memory array 31 many times to obtain data of vertices. If the corresponding input assembler stage 401 (of FIG. 4) is performed by the GPU 20, as shown in FIG. 7, the GPU 20 would access the memory device 30 (memory array 31) many times. Therefore, in one or more embodiments, offload processing by the memory device of such an input assembler stage 401 (of FIG. 4) and such example operations of the input assembly 110 of FIG. 7 can be used to reduce a frequency of memory access by the GPU 20.

Figure 8:
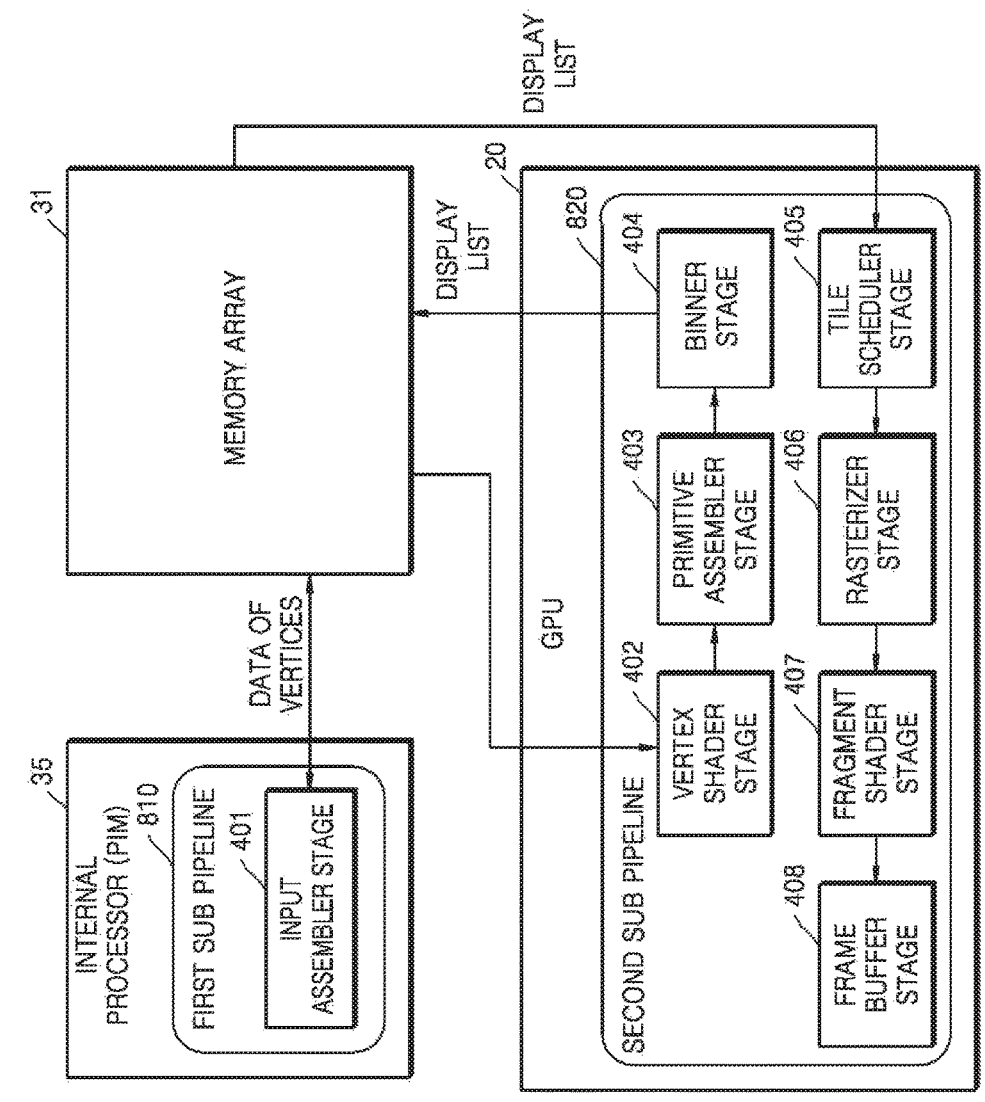
FIG. 8 is a view illustrating a GPU and an internal processor of a memory device performing a graphics pipeline for TBR through offload processing, according to another embodiment.

FIG. 8, as an example only, is a view illustrating a GPU 20 and an internal processor 35 performing a graphics pipeline for TBR through offload processing, according to another embodiment. Referring to FIG. 8, a first sub pipeline 810 corresponds to an input assembler stage 401 included in a graphics pipeline for TBR, and a second sub pipeline 820 corresponds to remaining stages 402 to 404 of the binning pipeline 101 (of FIG. 4) excluding the input assembler stage 401 and stages 405 to 408 included in the rendering pipeline 102 (of FIG. 4).

The internal processor 35 may be a PIM. According to an embodiment, when the graphics pipeline for TBR starts, the internal processor 35 reads graphics data from a memory array 31 and performs the first sub pipeline 810 including the input assembler stage 401. When the performing of the input assembler stage 401 is completed, the memory array 31 stores data of vertices as a performance result of the first sub pipeline 810 by the internal processor 35, for example. When the storage of the data of vertices is completed, that is, when the performing of the first sub pipeline 810 by the internal processor 35 is completed, for example, the GPU 20 reads the data of vertices from the memory array 31 and performs the second sub pipeline 820 including a vertex shader stage 402, a primitive assembler stage 403, a binner stage 404, a tile scheduler stage 405, a rasterizer stage 406, a fragment shader stage 407, and a frame buffer stage 408. When the frame buffer stage 408 is completed, an image of a frame, in which a rendering process is completed, is stored in the buffer 180 (of FIG. 3) (for example, a frame buffer).

As illustrated in FIG. 8, the internal processor 35 performs offload processing for some stage (the input assembler stage 401) of a graphics pipeline for TBR instead of the GPU 20, for example, and thus, a bandwidth of memory access of the GPU 20 and power consumption of the GPU 20 may be reduced.

Figure 9:
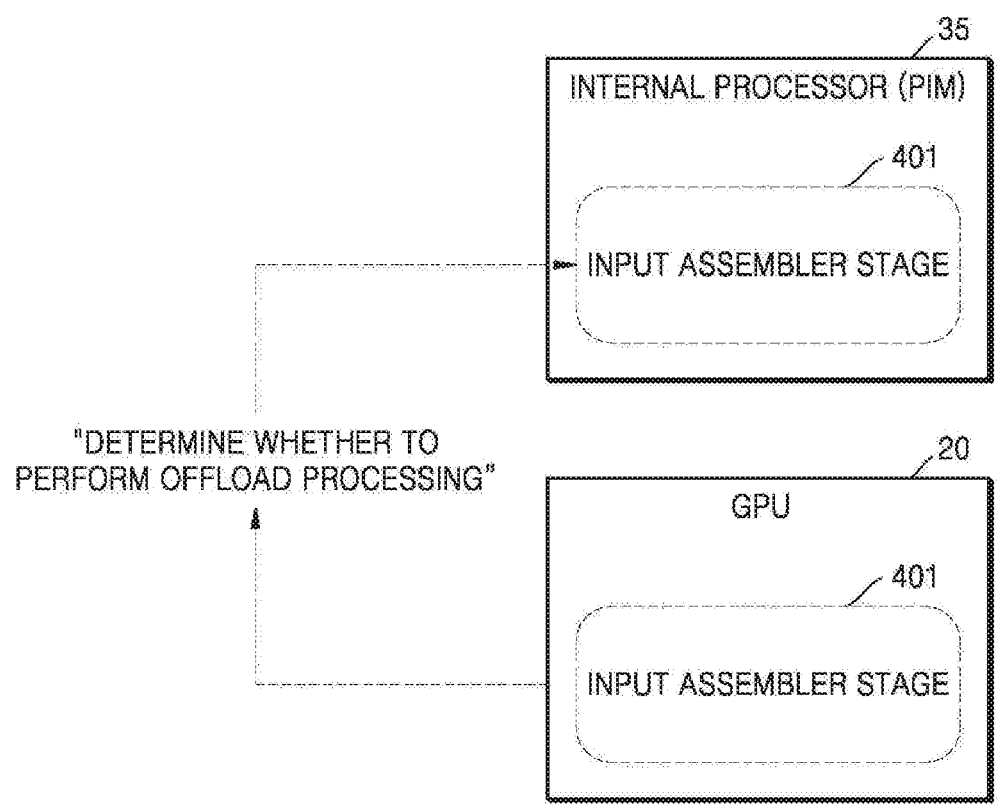
FIG. 9 is a view illustrating determining whether a GPU performs offload processing with respect to input assembler stages, according to an embodiment.

FIG. 9 is a view illustrating determining whether a GPU 20 performs offload processing with respect to input assembler stages, according to an embodiment. Referring to FIG. 9, the GPU 20 may control offload processing by an internal processor 35 as described above. For example, the GPU 20 may determine whether the internal processor 35 performs the input assembler stage 401 or the GPU 20 performs the input assembler stage 401 without offload processing. Additionally, the GPU 20 may determine whether to offload any other or alternative stage of the graphics pipeline to be performed by the internal processor 35.[WGG2]

The GPU 20 may determine whether to perform the offload processing based on efficiency of the vertex cache stage 740 (of FIG. 7). The efficiency of the vertex cache stage 740 (of FIG. 7) indicates a cache hit ratio or a cache miss ratio in the vertex cache stage 740 (of FIG. 7), and energy consumption of the vertex cache stage 740. The GPU 20 may monitor efficiency (for example, a cache hit ratio) of the vertex cache stage 740 while a graphics pipeline with respect to a previous frame is performed. If the efficiency of the vertex cache stage 740 does not meet a predetermined critical value as a monitoring result, the GPU 20 controls the input assembler stage 401 to be offload processed by the internal processor 35 when a graphics pipeline with respect to a current frame is performed. However, if the efficiency of the vertex cache stage 740 meets a predetermined critical value as a monitoring result, the GPU 20 controls the input assembler stage 401 to be processed by the GPU 20 when a graphics pipeline with respect to a current frame is performed.

However, the present disclosure is not limited thereto and the GPU 20 may control at least one specific stage, as a default, to be offload processed. Furthermore, the present disclosure is not limited thereto and the offload processing may be controlled by a CPU not by the GPU 20, e.g., which may control both the GPU 20 and the memory device 30, or perform rendering with offloading using the memory device 30 by the CPU when such a GPU 20 is not present or used.

Figure 10:
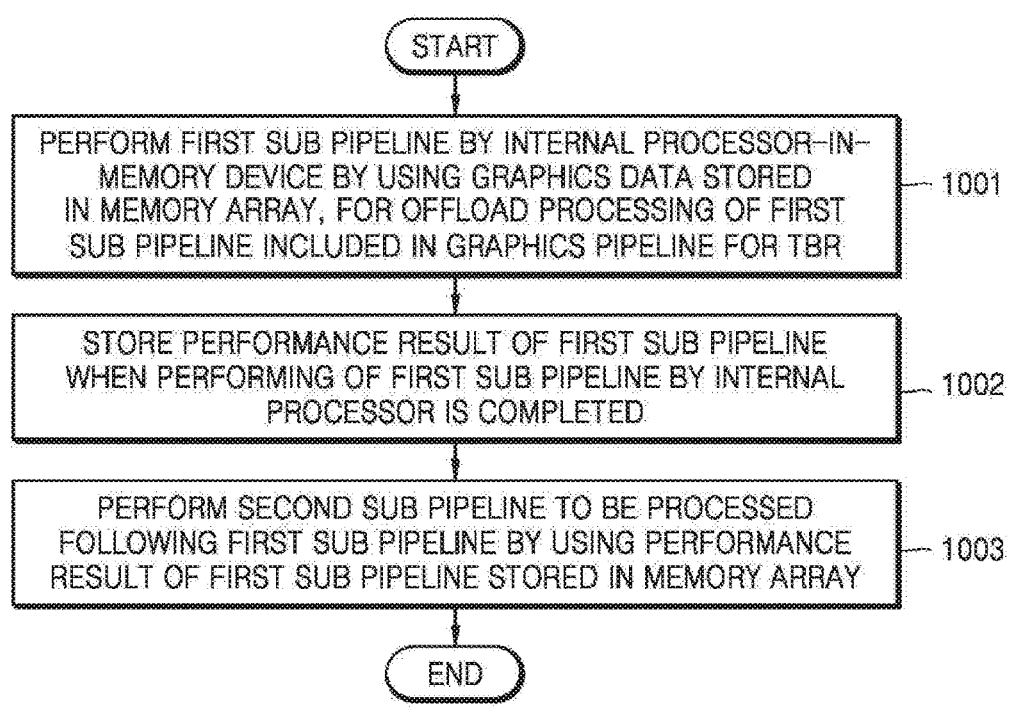
FIG. 10 is a flowchart of a method of performing a graphics pipeline for TBR of a computing system, according to an embodiment.

FIG. 10 is a flowchart illustrating a method of performing the graphics pipeline 100 for TBR of a computing system, according to an embodiment. The method of performing the graphics pipeline 100 in FIG. 10 is associated with the above-described embodiments. Therefore, although omitted below, the above-described contents may also be applied to the method of FIG. 10, depending on an embodiment.

In operation 1001, the internal processor 35 in the memory device 30, for offload processing of a first sub pipeline included in the graphics pipeline 100, may perform the first sub pipeline by using graphics data stored in the memory array 31.

In operation 1002, the memory array 31 may store a performance result of the first sub pipeline when the performing of the first sub pipeline by the internal processor 35 is completed.

In operation 1003, a host processor (e.g., the GPU 20) performs a second sub pipeline to be processed following the first sub pipeline by using the performance result of the first sub pipeline stored in the memory array 31.

Figure 11:
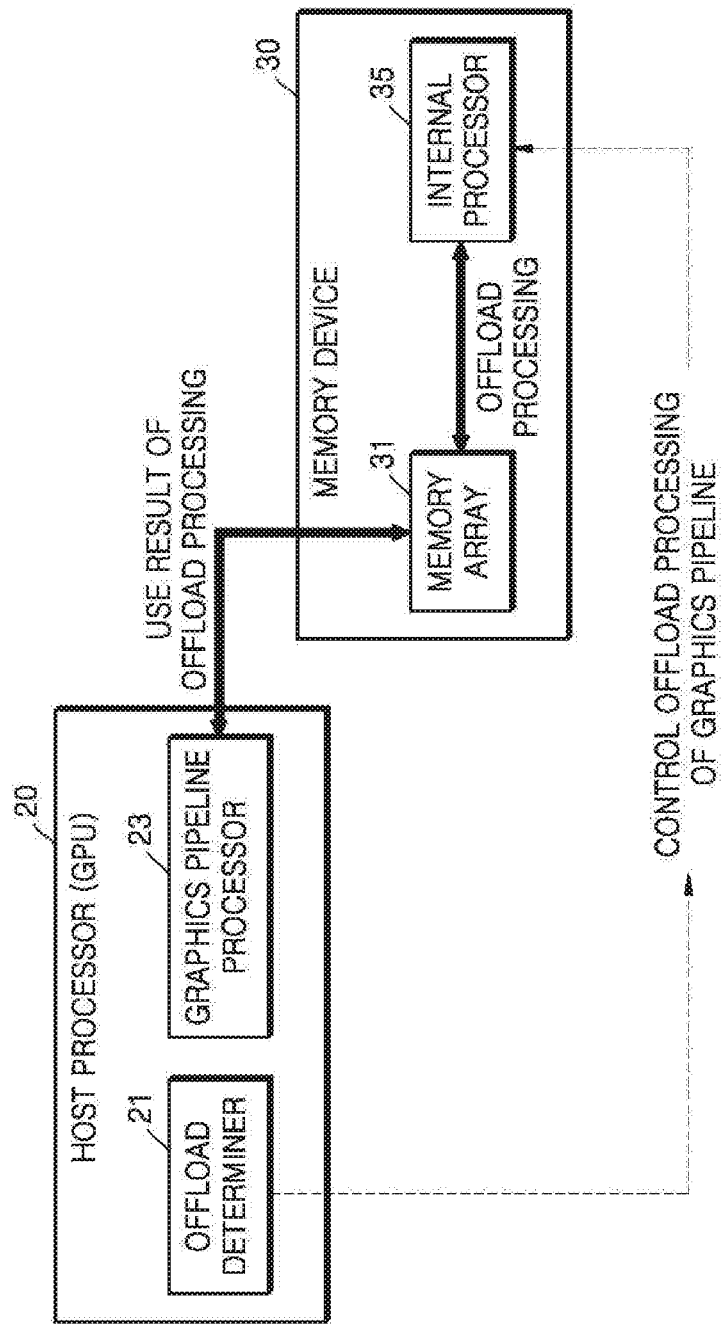
FIG. 11 is a detailed block diagram illustrating a host processor (GPU) according to an embodiment.

FIG. 11 is a detailed block diagram illustrating a host processor (e.g., GPU) 20 according to an embodiment. Referring to FIG. 11, the host processor (GPU) 20 may include an offload determiner 21 and a graphics pipeline processor 23. Meanwhile, the host processor (e.g., GPU) 20 may include only elements related to embodiments. Accordingly, it is to be understood by those skilled in the art that the host processor (e.g., GPU) 20 may further include other general-purpose elements in addition to the elements shown in FIG. 11.

The offload determiner 21 may determine whether an internal processor 35 in a memory device 30 performs offload processing of the first sub pipeline 610 (of FIG. 6) or 810 (of FIG. 8) included in the graphics pipeline 100 (of FIGS. 3 and 4) for TBR. For example, the offload determiner 21 may control offload processing by the internal processor 35. When offload processing is implemented, the graphics pipeline processor 23 may perform the remainder of the graphics pipeline 100 to be processed in the GPU 20.

If it is determined by the offload determiner 21 that the memory device 30 cannot or does not or is controlled not to perform offload processing, the graphics pipeline processor 23 independently performs the whole graphics pipeline 100 described above without offload processing. However, if the offload determiner 21 determines to offload a stage of the graphics pipeline, the offload determiner 21 transmits a command to the internal processor 35 to perform a first sub pipeline. Therefore, the first sub pipeline 610 (of FIG. 6) or 810 (of FIG. 8) is offload processed by the internal processor 35, and the performance result 520 (of FIG. 5) of the first sub pipeline is stored in a memory array 31. Afterwards, the graphics pipeline processor 23 receives the performance result 520 (of FIG. 5) of the first sub pipeline from the memory array 31, and performs the second sub pipeline 620 (of FIG. 6) or 820 (of FIG. 8) by using the received performance result 520 (of FIG. 5) of the first sub pipeline. The graphics pipeline processor 23 receives graphics data of the second sub pipeline 620 (of FIG. 6) or 820 (of FIG. 8) from the memory array 31.

Figure 12:
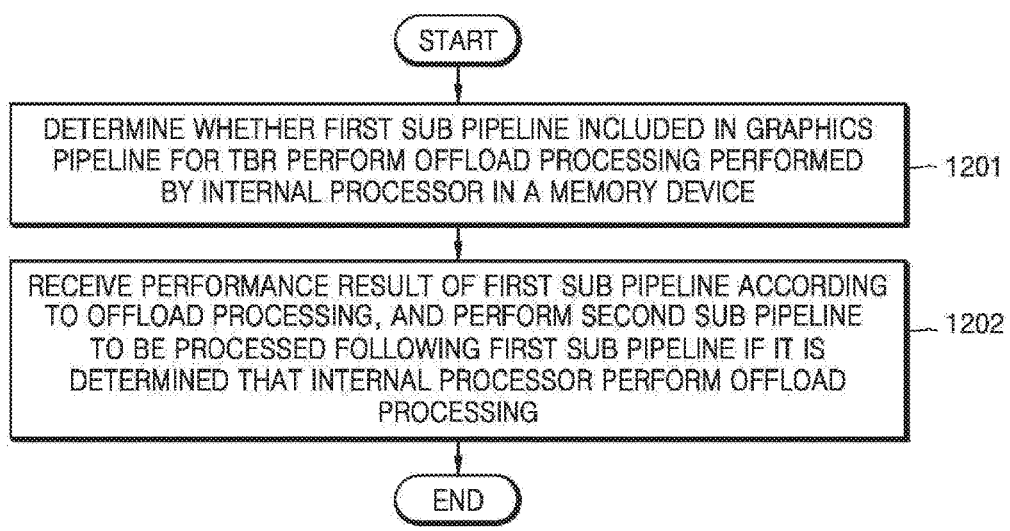
FIG. 12 is a flowchart of a method of performing a graphics pipeline for a TBR of a host processor (GPU), according to an embodiment.

In the example of FIG. 11, the host processor (e.g., GPU) 20 and the memory device 30 of FIG. 11 may perform offload processing as described above with respect to any one of the FIGS. 1-11. FIG. 12 is a flowchart illustrating a method of performing the graphics pipeline 100 for a TBR of the host processor (e.g., GPU) 20, according to an embodiment. The method of performing the graphics pipeline 100 in FIG. 12 is associated with the above-described embodiments. Therefore, although omitted below, the above-described contents may also be applied to the method of FIG. 12.

In operation 1201, the offload determiner 21 of the host processor (e.g., GPU) 20 determines whether the memory device 30 or internal processor 35 in the memory device 30 performs offload processing, such as offload processing of the first sub pipeline 610 (of FIG. 6) or 810 (of FIG. 8) included in the graphics pipeline 100 for TBR.

In operation 1202, if the offload determiner 21 determines that the internal processor 35 performs offload processing, for example, the graphics pipeline processor 23 of the host processor (e.g., GPU) 20 may receive a performance result of the first sub pipeline 610 according to the offload processing, and may perform the second sub pipeline 620 (of FIG. 6) or 820 (of FIG. 8) to be processed following the first sub pipeline 610.

The use of the terms "a", "an", and "the" and similar referents in the context of describing the present disclosure (especially in the context of the following claims) are to be construed to cover both the singular and the plural. Furthermore, the recitation of ranges of values herein are merely intended to serve as a shorthand method of referring individually to each separate value falling within the range, unless otherwise indicated herein, and each separate value is incorporated into the specification as if it were individually recited herein.

The apparatuses, units, modules, devices, and other components illustrated in FIGS. 1-9 and 11 that perform the operations described herein with respect to FIGS. 1-12 are implemented by hardware components. Examples of hardware components include controllers, sensors, generators, drivers, memories, comparators, arithmetic logic units, adders, subtractors, multipliers, dividers, integrators, a memory for storing program data and executing it, a permanent locker unit such as a disk drive, a communication port for handling communications with external devices, and user interface devices including a touch panel, keys, buttons, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-12. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described herein with respect to FIGS. 1-12 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

As a non-exhaustive example only, a terminal/device/unit as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device capable of wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A computing system comprising:
   a memory device including a memory array and an internal processor; and
   a host processor configured to determine whether to control the internal processor to perform offload processing,
   the memory device configured such that, in response to the host processor determining to control the internal processor to perform the offload processing, the internal processor performs a first sub pipeline of a graphics pipeline for tile-based rendering by using graphics data stored in the memory array,
   the host processor configured to perform a second sub pipeline of the graphics pipeline based on a result of the first sub pipeline,
   wherein the first sub pipeline comprises a binning pipeline configured to generate information about a primitive list corresponding to tiles for the graphics data stored in the memory array, and
   wherein the second sub pipeline comprises a rendering pipeline configured to perform rendering per tile by reading the generated information about the primitive list from the memory array.

2. The computing system of claim 1, wherein
   the memory array is configured to store the information about the primitive list corresponding to the tiles, as a result of the first sub pipeline.

3. The computing system of claim 1, wherein
   the host processor is a graphics processing unit (GPU), and
   the internal processor is a processor-in-memory (PIM).

4. The computing system of claim 1, wherein
   the first sub pipeline is an input assembler stage configured to supply data of vertices based on input draw calls.

5. The computing system of claim 4, wherein
   the second sub pipeline comprises the rendering pipeline and stages of the binning pipeline excluding the input assembler stage.

6. The computing system of claim 4, wherein the host processor is further configured such that the host processor performs the determining of whether to control the internal processor to perform the offload processing based on an efficiency of a vertex cache.

7. The computing system of claim 1, wherein the host processor is further configured such that, in response to the host processor determining not to control the internal processor to perform the offload processing, the host processor performs the first sub pipeline.

8. A method of performing a graphics pipeline for tile-based rendering of a computing system, the method comprising:
   determining, by a host processor, whether to control an internal processor of a memory device to perform offload processing; and
   in response to the determining, determining to control the internal processor to perform the offload processing,
      performing, by the internal processor, a first sub pipeline of a graphics pipeline for tile-based rendering by using graphics data stored in a memory array of the memory device, storing, in the memory array, a result of the first sub pipeline processed by the internal processor, and performing, by the host processor, a second sub pipeline using the result of the first sub pipeline stored in the memory array, wherein the first sub pipeline comprises a binning pipeline configured to generate information about a primitive list corresponding to tiles for the graphics data stored in the memory array, and wherein the second sub pipeline comprises a rendering pipeline configured to perform rendering per tile by reading the generated information about the primitive list from the memory array.

9. The method of claim 8, wherein
the result of the first sub pipeline comprises the information about the primitive list corresponding to the tiles.

10. The method of claim 8, wherein
the first sub pipeline is an input assembler stage configured to supply data of vertices based on input draw calls.

11. The method of claim 10, wherein
the second sub pipeline comprises the rendering pipeline and stages of the binning pipeline excluding the input assembler stage.

12. The method of claim 10, wherein the determining whether to control the internal processor of the memory device to perform the offload processing comprises:
determining, by the host processor, whether to control the internal processor to perform the offload processing based on an efficiency of a vertex cache.

13. A host processor comprising:
an offload determiner configured to select between,
an internal processor in an exterior memory device performing an offload processing of a first sub pipeline included in a graphics pipeline for tile-based rendering, and
the host processor performing the first sub pipeline; and
a graphics pipeline core configured to receive a result of the first sub pipeline and to perform a second sub pipeline following the first sub pipeline, wherein the first sub pipeline comprises a binning pipeline configured to generate information about a primitive list corresponding to tiles for graphics data stored in a memory array in the exterior memory device, and wherein the second sub pipeline comprises a rendering pipeline configured to perform rendering per tile by reading the generated information about the primitive list from the memory array.

14. The host processor of claim 13, wherein
the first sub pipeline is an input assembler stage configured to supply data of vertices based on input draw calls.

15. The host processor of claim 14, wherein
the second sub pipeline comprises the rendering pipeline and stages of the binning pipeline excluding the input assembler stage.

16. The host processor of claim 14, wherein
the offload determiner is further configured to perform a determination of which of the exterior memory device and the graphics pipeline core is to perform the first sub pipeline based on a determined efficiency of a vertex cache.

17. The host processor of claim 13, wherein
the offload determiner is configured to transmit a command to the internal processor of the exterior memory device to control the exterior memory device to perform the offload processing upon determination that the internal processor is configured to perform the offload processing.

* * * * *